United States Patent [19]

Schimmeyer

[11] 4,386,880

[45] Jun. 7, 1983

[54] TRAILER TRANSPORTING RAIL-WAY CAR

[76] Inventor: Werner K. Schimmeyer, 8937 Acorn Pl., Santa Rosa, Calif. 95405

[21] Appl. No.: 253,109

[22] Filed: Apr. 13, 1981

[51] Int. Cl.³ .......................... B60F 3/07; B61D 3/10; B61D 3/16

[52] U.S. Cl. .................................... 410/56; 105/4 R; 105/159; 213/97; 213/183; 213/184; 410/9; 410/22; 410/58; 414/495

[58] Field of Search .................. 105/3, 4 A, 4 R, 159, 105/215 C, 416, 418; 213/96, 97, 183, 184; 280/43.23; 410/1, 2, 3, 4, 56, 57, 58, 65, 9, 14, 15, 19, 22; 414/495

[56] References Cited

U.S. PATENT DOCUMENTS

| | | | |
|---|---|---|---|
| 2,462,666 | 2/1949 | Omar | 105/4 R |
| 2,826,155 | 3/1958 | Larsson | 105/4 R |
| 2,844,108 | 7/1958 | Madden | 410/56 X |
| 2,933,053 | 4/1960 | Mellam | 410/1 |
| 2,968,260 | 1/1961 | Scheldrup | 105/215 C |
| 3,238,899 | 3/1966 | Gutridge et al. | 105/416 X |
| 3,576,167 | 4/1971 | Macomber | 105/159 X |
| 3,610,169 | 10/1971 | Shannon | 105/215 C X |
| 3,762,337 | 10/1973 | McKeon et al. | 105/159 |
| 4,311,244 | 1/1982 | Hindin et al. | 105/3 X |

Primary Examiner—Robert B. Reeves
Assistant Examiner—Howard Beltran
Attorney, Agent, or Firm—Claude A. S. Hamrick

[57] ABSTRACT

A railway transport vehicle including a single load carrying beam having a novel coupling mechanism provided at each end and with one end including a rail truck and hydraulic lifters for lifting that end of the beam from a lowered position to a trailer axel engaging and lifting position, an upstanding support disposed proximate the other end of the beam for mating with and supporting the fifth wheel of the trailer unit to be transported, and a jack for lifting that end of the beam into a coupling position.

10 Claims, 10 Drawing Figures

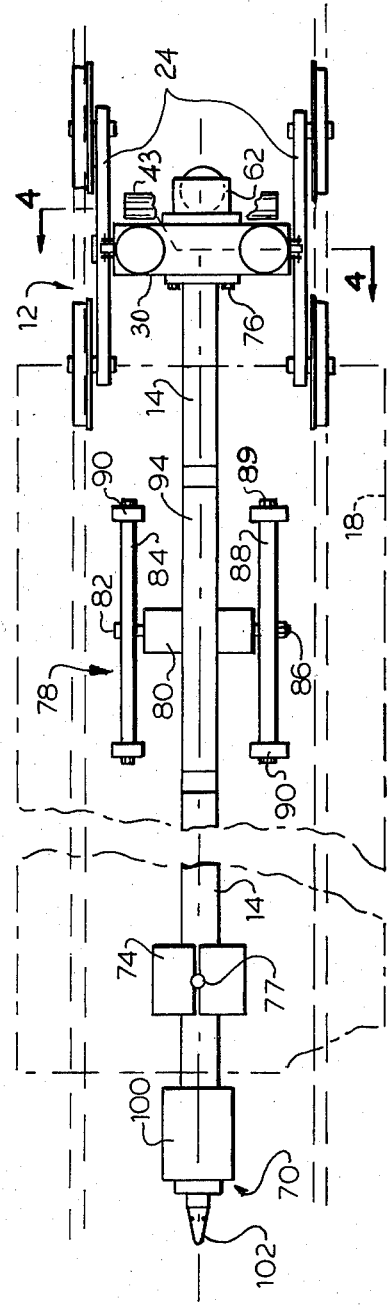
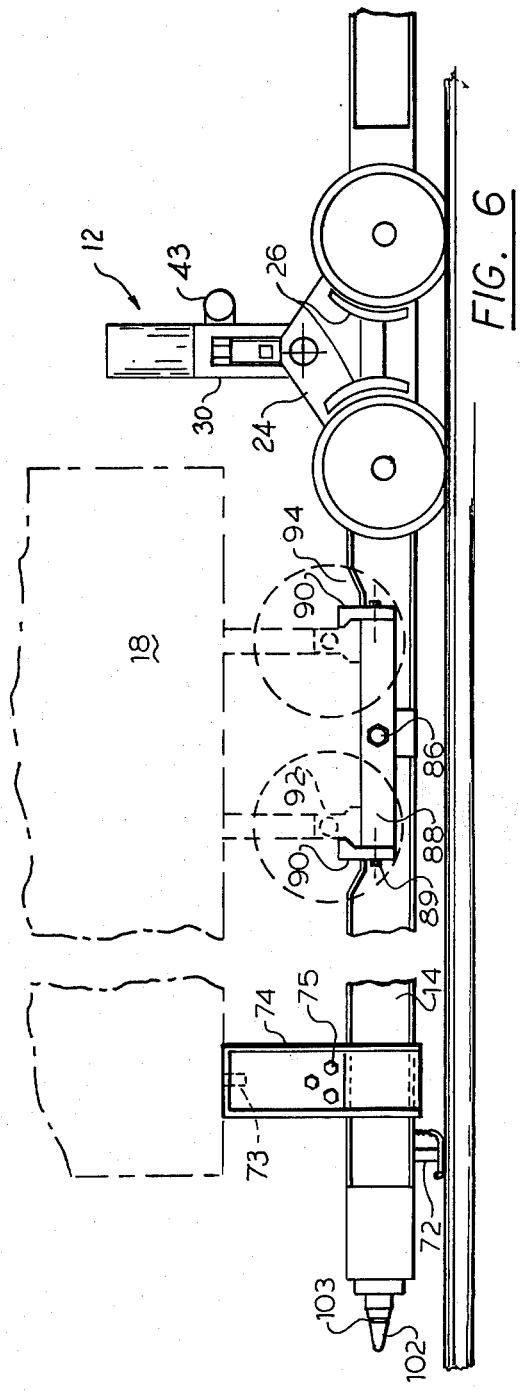

TRAILER TRANSPORTING RAIL-WAY CAR

BACKGROUND OF THE INVENTION

1. Field of the Invention

The present invention relates generally to rail transport vehicles and more particularly to an improved railway vehicle for transporting semitruck trailers at a high level of efficiency.

2. Discussion of the Prior Art

Although trailer units are commonly transported by rail on flatcars, such transport method is unduly expensive and energy consuming in that the flatcar is frequently considerably larger and heavier than is required to do the job and when empty must frequently be pulled to another pickup site. Various solutions to the problem of transporting semitruck trailers by railway have been suggested before. However, such solutions have suffered from the disadvantages of requiring that special loading and/or unloading facilities must be provided (see for example, U.S. Pat. Nos. 3,576,167 and 2,933,052), or have required that the transported trailer unit be modified (see U.S. Pat. Nos. 3,762,337 and 3,610,169). These solutions require specialized equipment thereby ruling out general usage of the various devices.

More particularly, the problem with the former solution is that transfer units can only be loaded and unloaded at a particular location; the problem with the latter solution is that the trucker must bear the additional expense of having his highway unit modified to conform to the requirements of the railway units.

SUMMARY OF THE PRESENT INVENTION

It is therefore a principal objective of the present invention to provide a novel highway trailer railway transport vehicle which is lightweight, is adapted to accommodate most roadway trailer configurations, and which requires no special provision for loading and unloading.

Another object of the present invention is to provide a lightweight trailer transporting rail unit which can be readily integrated into a standard train assemblage.

Briefly, a presently preferred embodiment of the present invention includes a single load carrying beam having a novel coupling mechanism provided at each end and with one end including a rail truck and hydraulic lifters for lifting that end of the beam from a lowered position to a trailer axle engaging and lifting position, an upstanding support disposed proximate the other end of the beam for mating with and supporting the fifth wheel of the trailer unit to be transported, and a jack for lifting that end of the beam into a coupling position.

An important advantage of the present invention is that it provides a lightweight alternative to the railway flatcar practice currently used to transport highway trailers.

Another advantage is that it provides a railway unit that is universal in application and does not require any special loading mechanisms or accommodations.

These and other advantages of the present invention will no doubt become apparent to those skilled in the art after having read the following detailed description of a preferred embodiment.

IN THE DRAWING

FIG. 5 is a partially broken plan view illustrating one of the transport units shown in FIG. 1;

FIG. 6 is a partially broken side view of the transport unit shown in FIG. 5;

DESCRIPTION OF THE PREFERRED EMBODIMENT

Figure 1:
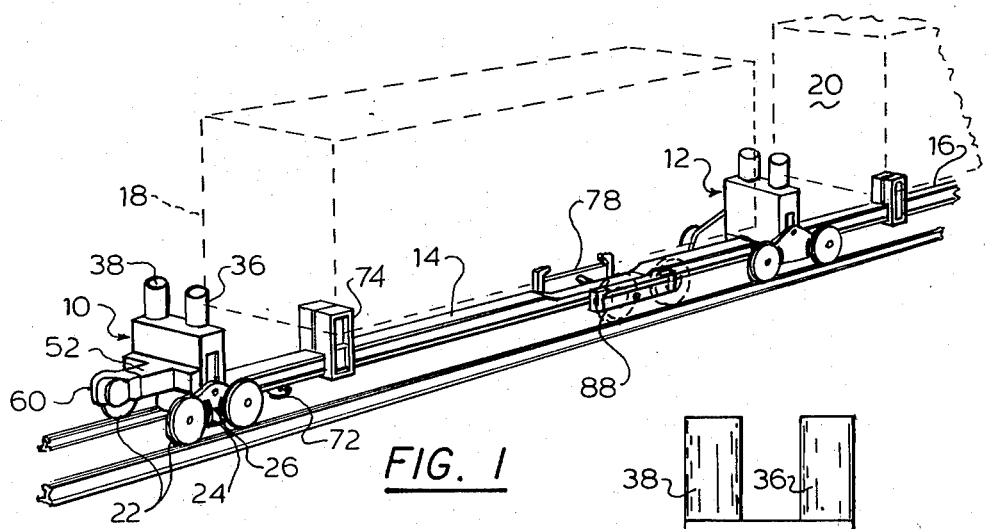
FIG. 1 is a perspective view illustrating a highway trailer railway transport system including several units in accordance with the present invention.

In FIG. 1 of the drawing, an assemblage of highway trailer rail transport units in accordance with the present invention is shown and includes a first railway wheel truck 10, a second railway wheel truck 12, a first load carrying beam 14, a second beam 16, etc., forming articulated units of a train. Shown in phantom and mounted to the beams 14 and 16 are highway trailer units 18 and 20.

Figure 2:
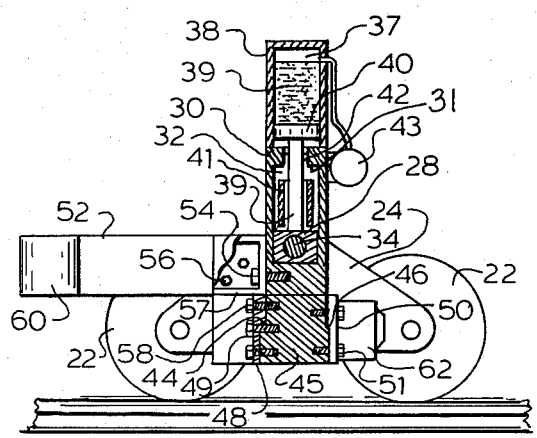
FIG. 2 is a partially broken side view of a railway truck and coupling unit in accordance with the present invention.
Figure 4:
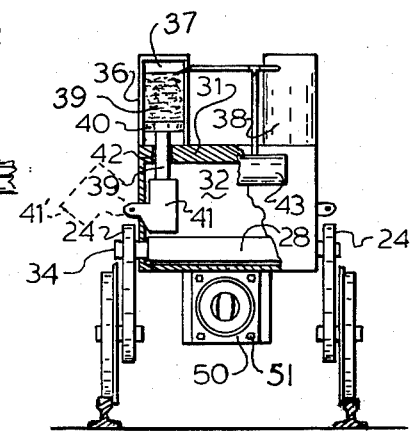
FIG. 4 is a partially broken rear elevation of the railway truck unit shown in FIG. 2.

The front truck 10 is comprised of four standard flange railway wheels 22 which are attached to triangular-shaped side plates 24 by stub axis or other suitable journalling mechanisms. Standard air pressure operated brakes 26 are also carried by plate 24. Connecting the tops of the two side plates 24 and appropriately journalled thereto is a crossbeam 28 (see FIGS. 2 and 4). Enveloping the beam 28 is a lift body or structure 30 having a cavity 32 for slideably receiving crossbeam or bolster 28, the cavity 32 being open on each side to form guide ways for the ends 34 of beam 28.

Secured to the top of lift body or structure 30 are a pair of hydraulic cylinders 36 and 38 having pistons 40 with drive rods 39 which extend down through openings 42 in structure 30 to engage the top of crossbeam 28. A hydraulic pump 43 is affixed to one side of structure 30 and pumps hydraulic fluid 39 into the cylinders 36 and 38 to drive the pistons 40 downwardly. Note that an air pocket 37 is provided at the top of each cylinder so as to form an air cushion allowing approximately two inches of cushioned travel of the pistons 40.

In order to insure that a fluid leak or other hydraulic failure does not allow the pistons 40 to fully retract and lower the unit into its lower position, safety blocks 41 of generally U-shaped cross-section are pivotally attached to structure 30 so as to be pivotable between a blocking position (see FIG. 4) and an unblocking position as shown by the dashed lines 41'. A clearance is provided between the tops of blocks 41 and the under side of structure plate 31 so that in normal use the air cushions in cylinders 36 and 38 are permitted to perform their shock absorbing function without the plate 31 bottoming against the blocks 41.

Figure 3:
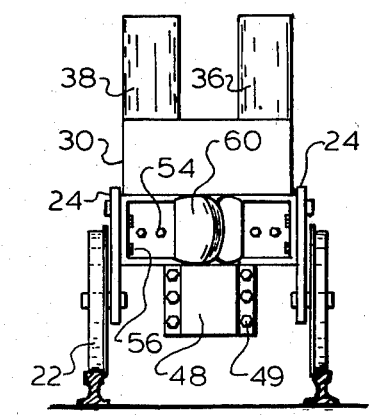
FIG. 3 is a front elevation of the railway truck unit shown in FIG. 2.

The lower extremity 45 of member 30 is of substantial construction and is provided with front and rear shoulders 44 and 46 respectively, which provide supporting surfaces for mounting plates or flanges 48 and 50 respectively. Plates 48 and 50 are secured to the lower portion 50 by bolts 49 and 51 (see also FIGS. 3 and 4).

When used as a coupling truck for coupling units in accordance with the present invention to a standard railway car or engine, a T-shaped adaptor unit 52 is secured to structure 30 by means of bolts 54 and is secured to side plates 24 by means of bolts 56. The rear most edge 57 of unit 52 rests upon the top edge 58 of plate 48. A standard railway coupling mechanism 60 is carried at the forward end of unit 52. Plate 50 forms the mounting flange of a female coupling unit 62 which will be explained in more detail below with regard to FIGS. 7 and 8.

Referring now additionally to FIGS. 5 and 6, it will be noted that beam 14 is provided with a front coupling unit 70, a front end jack 72, and a fifth wheel support mechanism 74. The opposite end of beam 14 is secured to a rail truck unit 12 by means of bolts 76.

Proximate the rear end of beam 14, a trailer axle engaging support mechanism 78 is attached and includes laterally extending structural members 80 to the ends of which are attached a heavy pin 82 that carries a support beam 84, and a threaded pin and collar assembly 86 which carries the support beam 88. Bolted to each end of the support beams 84 and 88 by threaded bolts 89 are clamps 90 which are used to fasten the axle assembly 92 of a carried trailer unit to the transporter. Fastening of the clamps 90 against the axle assembly is accomplished by tightening the bolts 89. Note that in order to insure that the support beams 84 and 88 carry all of the weight of the trailer the vertical cross section of beam 14 is reduced as indicated at 94.

The fifth wheel support unit 74 may take any suitable configuration. The illustrated version includes a pair of upstanding structural members which are bolted together by means of three or more bolts 75 and clampingly engage the beam 14 at any selected point along its length to accommodate a particular trailer configuration. A suitable opening 77 is provided in the top for engagement by the trailer coupling pin 73 (FIG. 6) of the trailer.

The front coupling unit 70 includes a hydraulic shock buffer 100 and a conically-shaped male coupling member 102 having a pair of vertically extending slots 103 formed in its sides. The buffer 100 is of standard configuration and is used to damp humping forces incurred during use of the apparatus.

Figure 7:
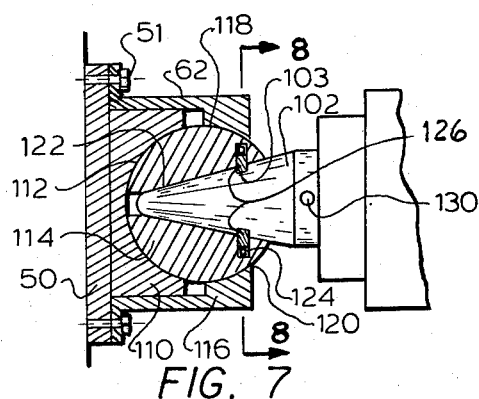
FIG. 7 is a partially broken plan view illustrating a coupling unit in accordance with the present invention.
Figure 8:
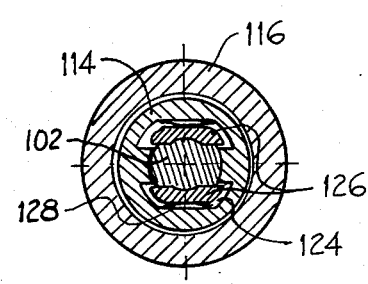
FIG. 8 is a cross section taken along the line 8—8 in FIG. 7.

In FIGS. 7 and 8, the male and female components of the coupling assembly are illustrated in more detail. As viewed from the top in FIG. 7, the female coupling unit 62 includes an inner socket member 110 which is affixed to plate 50 and has a semispherical cavity 112 formed in its outer face for recieving a steel ball member 114. Ball member 114 is held in position by an outer socket housing 116 which is secured to plate 50 and member 45 (FIG. 2) by means of bolts 51. Note that housing 116 has an annular surface 118 of partially spherical configuration for mating with ball member 114, and a circular opening 120 through which a part of ball member 114 extends.

Ball member 114 has a conical bore 122 formed therein to provide a receptacle for receiving the male coupling member 102. Laterally extending vertically oriented slots 124 are provided in surface 122 on each side thereof and have vertically extending keys 126 positioned therein which are spring loaded outwardly by springs 128. Keys 126 mate with slots 103 in the sides of member 102 and serve to lock the coupled union together. Note that the ball unit 114 allows the longitudinal axis of the transport unit to which member 102 is attached to freely rotate relative to the longitudinal axis of the unit to which coupling member 62 is attached.

In order to uncouple member 102 from member 114, the vertical load on the forward end of the transport is relieved by means of the jack 72 (FIGS. 1 and 6), and an uncoupling tool in the form of a long rod or other lever is inserted into a hole 130 and used to rotate member 102 90° in either direction. It will be appreciated that such rotation causes keys 126 to be depressed into their slots against the force of springs 128 thus removing them from the slots 103 and allowing member 102 to be withdrawn.

The above-described coupling assembly is capable of supporting the vertical load imposed upon beam 14 yet allows full angular freedom of movement between the axis of the pulled unit and the pulling unit.

Figure 9:
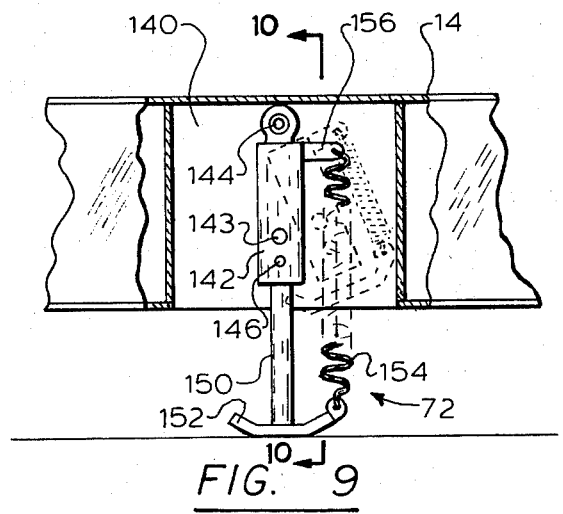
FIG. 9 is a partially broken side view illustrating a front support jack in accordance with the present invention.
Figure 10:
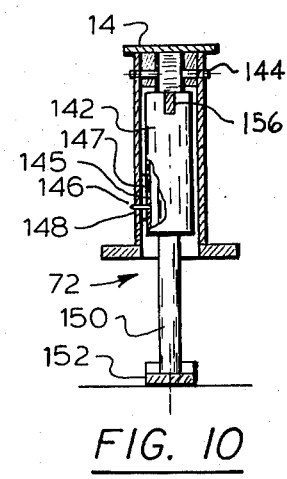
FIG. 10 is a partially broken side elevation of the jack shown in FIG. 9.

Turning now to FIGS. 9 and 10, the jack shown in FIGS. 1 and 6 is illustrated in detail. Jack 72 is contained within a cavity 140 formed in beam 14 and includes a hydraulic jack cylinder 142 pivotally secured to the sidewalls of beam 14 at 144. Cylinder 142 is held in the vertical position by means of a shear pin 146 that extends from an opening in one side of cylinder 142 through an opening 148 in a sidewall of beam 14.

Cylinder 142 has a hydraulic bleed port 143 which is sealed by a plug that 147 held in place by a side plate 145 when the jack is held in its vertical position by pin 146. When the jack is swung from vertical position shearing pin 146, the port plug 147 is released allowing the hydraulic fluid to drain. The spring 154 then retracts the foot 152. Additional conduits (not shown) are provided for either returning the dumped hydraulic fluid to a reservoir or limiting the loss to that fluid contained within the jack cylinder. Hydraulic energization of the jack is accomplished by pump 43 in response to the actuation of appropriate control mechanism (not shown) which are included in the system. The jack shaft 150 has a foot 152 attached to the lower end thereof and a return spring 154 is stretched between foot 152 and an arm 156 extending outwardly from the top of cylinder 142.

The purpose of this configuration is to insure that in the event a trainman forgets to retract the jack prior to moving the transport unit and the foot strikes an object along the track, permanent damage will not be inflicted upon the jack mechanism. Instead, only the shear pin 146 will be damaged and the device can be reused after the simple replugging of the cylinder 142 and the installation of a new shear pin.

In use, a transport unit may be set on a track or track siding at a shipper's plant and lowered into its lowest position. A trucker then backs the trailer to be transported over the transporting unit, aligning the axles of the trailer as closely as possible over the axle support beams 84 and 88. The tractor is then removed leaving the trailer self-supported. The forward end of transporter beam 14 is then raised using the jack 72 and forward support unit 74 is affixed to the fifth wheel pin of the trailer. The two halves of the support 74 are clamped by bolts 75 onto beam 14 with sufficient force to resist movement along the beam and thereby maintain proper trailer positioning.

The hydraulic cylinders 36 and 38 are then actuated to raise the rear end of beam 14 until the axel support beams 84 and 88 engage the trailer axles and begin to raise the load. The axle clamps 90 are then used to fasten the axle assemblies to beams 84 and 88. Since it is difficult for the truck driver to align the trailer exactly relative to the transporter unit, a tolerance of approximately 1 inch is provided in either direction by means of the sliding fit of beam 84 on pin 82 and the interaction between cap and bolt assembly 86 and beam 88.

By further actuation of the hydraulic lifters 36 and 38, beam 14 is then further raised until cross member 28 bottoms out. The forward jack 72 is then used to raise the forward end of the beam until the beam is horizontal, at which time the transporter is ready for pickup for the railroad. If the transporter is to be coupled to another transporter unit in accordance with the present invention, all that need be done is to back the engaging unit into engagement with the male coupling end which will force its way into the ball socket until it bottoms out and the keys 126 snap into the grooves 103.

In the event that the unit is to be coupled to a standard railcar or pulling engine, a transporter truck adapted as described above and illustrated in FIGS. 2–4 must be used. Although not shown in the drawing, it will be appreciated that the transporters are equipped with air lines which extend from the braking systems 26 to standard couplings that attach to the railway braking system.

When in use, the hydraulic shock units 100 provide horizontal buffer action at the forward end of each unit, and vertical shock is absorbed by shock absorbing units formed integral with the hydraulic lifters 36 and 38.

In use, all loads are transmitted through the center line of the main support beam. Consequently, units in accordance with the present inventon may be sandwiched between groups of standard railcars just as if they were themselves standard units. It will also be appreciated that even though these units may be designed to carry as much as 70,000 pound loads or more they are themselves quite lightweight when compared to a standard flatcar used for the same purpose. As a result, shipping costs should be substantially less due to the energy savings resulting from their use.

It is advantageous that devices in accordance with the present invention fit all present truck trailer configurations and require no special loading equipment or loading terminals. An additional advantage is that transporter units in accordance with the present invention support a trailer at its strongest points and eliminate vibration causing wheel bearing damage that is likely to occur when trailers are shipped on flatcars in the usual fashion.

Additional advantages are that since the transporter units can be easily disassembled, they may be easily shipped from one place to another for usage, thereby reducing demurage costs; the units are of low profile and have a low center of gravity; the ball joint taper pin coupling gives vertical support without restricting pivoting movement of the coupled units; the transporter may be assembled in a rail train in either direction; and since only a single trailer is loaded on a single unit, more flexible use of the units is made possible.

Although a single preferred embodiment of the present invention has been described above, it is contemplated that after having read the above disclosure, other alterations and modifications of the invention will become apparent to those skilled in the art. It is therefore intended that the appended claims be interpreted as covering all such alterations and modifications as fall within the true spirit and scope of the invention.

What is claimed is:

1. An elongated rail transport vehicle for carrying highway trailer units in an articulated train, comprising:

railway wheel truck means including left and right sets of rail engaging wheels, left and right side plate means respectively joining together the wheels of each said set, and means forming a transversely extending beam the ends of which are connected to said left and right side plate means, body means enveloping at least part of said transverse beam, and lift means coupling said body means to said transverse beam and operative to lift said body means relative to said transverse beam from a lowered position to a raised position;

means forming a longitudinally extending main beam having one end attached to and carried by one side of said body means, the other end of said main beam including a first coupling means, said main beam and said first coupling means being adapted to handle buff, draft and vertical loads;

jack means carried by said main beam and disposed proximate said first coupling means, said jack means being operative to lift said other end of said main beam to a selected elevation;

means disposed upon said main beam proximate said jack means and extending upwardly therefrom for engaging a tractor coupling means of a highway trailer unit to be carried by said transport vehicle and for supporting a forward end of such trailer unit;

axle support means affixed to and carried by said main beam for engaging, lifting and supporting an axle assembly of a carried trailer unit, said axle support means being disposed low enough when said body means is in said lowered position so as to allow the axle assembly of the trailer unit to pass thereover, and being raised high enough when said body means is in said raised position so as to lift the wheels of the trailer unit off the ground; and second coupling means affixed to the opposite side of said body means and adapted for engagement by a first coupling means of another transport vehicle.

2. An elongated rail transport vehicle as recited in claim 1 wherein said axle support means includes a pair of support beams pivotally affixed to said main beam, said support beams including clamping means adapted to clampingly engage the axle assembly of a carried trailer unit.

3. An elongated rail transport vehicle as recited in claim 1 wherein said lift means includes a hydraulic cylinder attached to said body means, and a piston contained within said cylinder and coupled to said transverse beam such that when hydraulic fluid is pumped into said cylinder, said piston exerts a force upon said transverse beam and causes said body means to rise relative thereto and raise said one end of said main beam.

4. An elongated rail transport vehicle as recited in claim 1 wherein said second coupling means is of a ball and socket configuration, the ball means of which includes a conically configured bore, and wherein said front coupling means includes a generally conically-shaped member adapted for mating reception within the conically configured bore of said ball means.

5. An elongated rail transport vehicle as recited in claim 4 wherein said ball means further includes at least one transversely extending slot formed in a wall of said bore, and locking key means slideably disposed within said slot and extending into said bore, and wherein said conically-shaped member includes at least one transversely extending slot adapted to receive a portion of said key means when said conically-shaped member is matingly received within said bore.

6. An elongated rail transport vehicle for carrying highway trailer units in an articulated train, comprising:
   railway wheel truck means including left and right rail engaging wheel means joined together by means forming a transversely extending beam, body means carried by said transverse beam, and lift means coupling said body means to said transverse beam and operative to lift said body means relative to said transverse beam from a lowered position to a raised position;
   means forming a longitudinally extending main beam having one end attached to and carried by one side of said body means, the other end of said main beam including a first coupling means, said main beam and said first coupling means being adapted to handle buff, draft and vertical loads;
   jack means carried by said main beam and disposed proximate said first coupling means, said jack means being operative to lift said other end of said main beam to a selected elevation;
   means disposed upon said beam proximate said jack means and extending upwardly therefrom for engaging a tractor coupling means of a highway trailer unit to be carried by said transport vehicle and for supporting the forward end of such trailer unit;
   axle support means affixed to and carried by said main beam for engaging, lifting and supporting an axle assembly of a carried trailer unit, said axle support means being disposed low enough when said body means is in said lowered position so as to allow the axle assembly of the trailer unit to pass thereover, and being raised high enough when said body means is in said raised position so as to lift wheels of the trailer unit off the ground; and
   second coupling means affixed to the opposite side of said body means and adapted for engagement by a first coupling means of another transport vehicle.

7. An elongated rail transport vehicle as recited in claim 6 wherein said axle support means includes a pair of support beams pivotally affixed to said main beam means, and clamping means affixed to said support beams and adapted to clampingly engage the axle assembly of a carried trailer unit.

8. An elongated rail transport vehicle as recited in claim 6 wherein said lift means includes a cylinder attached to said body means, and a piston contained within said cylinder and coupled to said transverse beam such that when fluid is pumped into said cylinder, said piston exerts a force upon said transverse beam and causes said body means to rise relative thereto and raise said one end of said main beam.

9. An elongated rail transport vehicle as recited in claim 6 wherein said second coupling means is of a ball and socket configuration, the ball means of which includes a conically configured bore, and wherein said front coupling means includes a generally conically-shaped member adapted for mating reception within the conically configured bore of said ball means.

10. An elongated rail transport vehicle as recited in claim 9 wherein said ball means further includes at least one transversely extending slot formed in a wall of said bore, and locking key means slideably disposed within said slot and extending into said bore, and wherein said conically-shaped member includes at least one transversely extending slot adapted to receive a portion of said key means when said conically-shaped member is matingly received within said bore.

* * * * *